United States Patent [19]
Olson

[11] Patent Number: 5,337,957
[45] Date of Patent: Aug. 16, 1994

[54] MICROPROCESSOR-BASED IRRIGATION SYSTEM WITH MOISTURE SENSORS IN MULTIPLE ZONES

[76] Inventor: Troy C. Olson, 7505 N. Shore Cir., Forest Lake, Minn. 55025

[21] Appl. No.: 84,621

[22] Filed: Jul. 1, 1993

[51] Int. Cl.⁵ .................. B05B 12/12; A01G 25/16
[52] U.S. Cl. ............................ 239/63; 239/69; 239/70; 137/78.3
[58] Field of Search .............. 239/63, 64, 69, 70; 137/78.3

[56] References Cited

U.S. PATENT DOCUMENTS

| | | | |
|---|---|---|---|
| 4,176,395 | 11/1979 | Evelyn-Veere et al. | 239/69 |
| 4,190,884 | 2/1980 | Medina | 239/63 |
| 4,197,866 | 4/1980 | Neal | 239/63 |
| 4,209,131 | 6/1980 | Barash et al. | 239/68 |
| 4,244,022 | 1/1981 | Kendall | 239/70 |
| 4,304,989 | 12/1981 | Vos et al. | 239/63 |
| 4,333,490 | 6/1982 | Enter, Sr. | 239/64 |
| 4,396,149 | 8/1983 | Hirsch | 239/63 |
| 4,545,396 | 10/1985 | Miller et al. | 239/64 |
| 4,548,225 | 10/1985 | Busalacchi | 239/64 |
| 4,626,984 | 12/1986 | Unruh et al. | 239/69 |
| 4,646,224 | 2/1987 | Ransburg et al. | 239/63 |
| 4,684,920 | 8/1987 | Reiter | 239/63 |
| 4,693,419 | 9/1987 | Weintraub et al. | 239/63 |
| 4,718,446 | 1/1988 | Simpson | 239/64 |
| 4,852,051 | 7/1989 | Mylne, III | 239/69 |
| 4,875,498 | 10/1989 | Andrews et al. | 239/64 |
| 4,892,113 | 1/1990 | Fattahi | 239/64 |
| 4,922,433 | 5/1990 | Mark | 239/63 |
| 4,934,400 | 6/1990 | Cuming | 239/64 |
| 4,936,333 | 6/1990 | Bireley | 239/64 |
| 4,937,732 | 6/1990 | Brundisini | 239/69 |
| 4,993,640 | 2/1991 | Baugh | 239/64 |
| 5,021,939 | 6/1991 | Pulgiese | 239/67 |
| 5,038,268 | 8/1991 | Krause et al. | 239/69 |
| 5,060,859 | 10/1991 | Bancroft | 239/64 |
| 5,097,861 | 3/1992 | Hopkins et al. | 239/63 |
| 5,148,826 | 9/1992 | Bakhshaei et al. | 239/63 |
| 5,148,985 | 9/1992 | Bancroft | 239/64 |

*Primary Examiner*—Karen B. Merritt
*Attorney, Agent, or Firm*—Haugen and Nikolai

[57] ABSTRACT

An irrigation system having a microprocessor-based controller for providing a desired degree of watering to an area which is divided up into zones, with each zone including a solenoid water valve in series with one or more water dispensing devices, such as spray heads or a drip irrigation tube. Also associated with each of the zones is a moisture sensor which is arranged to be periodically interrogated by the microprocessor-based controller and, when interrogated, provides an electrical signal proportional to the degree of moisture in the soil proximate the sensor. A feature of the invention is that the microprocessor-based controller is extremely easy to program due to the combination of a display screen on which various menus can be presented and a minimum quantity of push-button keys for calling up the menus and for altering sprinkling parameters that are displayed on the menu screens.

12 Claims, 6 Drawing Sheets

MICROPROCESSOR-BASED IRRIGATION SYSTEM WITH MOISTURE SENSORS IN MULTIPLE ZONES

BACKGROUND OF THE INVENTION

Field of the Invention

This invention relates generally to commercial and residential turf irrigation systems, and more particularly to an improved, microprocessor-based irrigation system for monitoring soil conditions in a plurality of zones and for controlling the flow of water to the different zones on an "as needed" basis. The microprocessor-based controller of the present invention is also highly flexible and easy to program because of the interactive software incorporated.

Discussion of the Prior Art

A rather wide variety of underground sprinkling systems are available in the marketplace and are described in the patent literature in which water, under pressure, is made to flow through a plurality of branches leading to different zones comprising the area to be irrigated under control of solenoid operated water valves. A water valve, when energized, permits water to flow through one or more spray heads in a given zone in an attempt to uniformly distribute the water over that particular zone. Individual zones are generally watered sequentially so that an undue drop in water pressure is not encountered as would be the case if all spray heads in all zones are fed simultaneously. In accordance with the prior art, the controller for overseeing the turn-on and turn-off of the respective solenoid valves includes a plurality of timing mechanisms, one being for initiating the turn-on of the system at preprogrammed watering days and at a particular time on such watering days. Further timing means are provided for each of the zones which can be set to determine the length of time that the solenoid valve associated with that zone will remain on. In the simplest of systems, the watering day/water time timing device is an alternating current synchronous motor driving a cam that cooperates with electrical switches.

Programming is accomplished by selectively displacing manually positionable pins on a control panel for setting the watering day and time on the selected watering days when irrigation is to begin. The length of time that any given solenoid valve for a particular zone is actuated is controlled by a further electronic timer. Typical of the above-described systems is that supplied by the Toro Company of Minneapolis, Minn., and which is described in the Bancroft Patent 5,060,859.

A more technically advanced irrigation control system is described in the Krause et al. Patent 5,038,268. In accordance with this patent, the controller comprises a microcomputer having a keyboard and a display for controlling up to sixteen watering stations. The microprocessor is adapted to receive control signals from moisture sensors in each of the zones as well as from a flow meter used to measure the cumulative flow through all of the branches whereby the amount of water distributed is either a precomputed time interval or a lesser interval as determined by the output from the moisture sensor for the zone in question. The system of the Krause et al. '268 patent involves a rather complicated keyboard having three keys per station for establishing an off-mode, an on-mode and an auto-mode for each such station. The keyboard also incorporates a numerical display for providing the operator with an indication of previously programmed start and stop times as well as fault messages used in trouble-shooting. There is no interaction between the display and the keyboard for facilitating the programming of the multiple valves used in a multi-zone system.

There is a need in the residential/commercial irrigation industry for an irrigation controller that responds to soil moisture sensors in individual zones as a way of conserving water. An ideal controller should be "user friendly", i.e., easy to program and requiring a minimum number of keys or push-buttons to operate the controller. It should also allow irrigation to take place in zones where watering is required, while bypassing zones where adequate soil moisture is indicated- To add flexibility, it should be possible to selectively deactivate any of the moisture sensors to thereby override the modification to the controller performance caused by sensor inputs. Moreover, the system should be easy to trouble shoot in the event of faults in any of the plurality of zones.

SUMMARY OF THE INVENTION

It is accordingly a principal object of the present invention to provide an improved microprocessor-based area irrigation system that, due to the available interaction between a multi-line display and only a few push-button switches on an operator's panel, can be readily programmed.

Another object of the invention is to provide an automatic irrigation system in which the area to be irrigated is divided into multiple zones, with each zone including a moisture sensor and a solenoid valve. A microprocessor-based controller is coupled to receive inputs from the moisture sensor and to provide appropriate on/off commands to the solenoid-operated water valves so that irrigation will take place in the various zones on preprogrammed watering days at a specified time of day and for an interval which is either a programmed length of time or a lesser time determined by the moisture sensor.

The foregoing objects and features of the invention are achieved by providing an irrigation system for an area to be watered, the area being divided into a plurality of discrete zones of possible different soil conditions, where each zone includes at least one sprinkler head, soaker hose or other water dispensing device and a solenoid valve having an "on" state and an "off" state for controlling the flow of water to such device for that zone and which comprises a moisture sensor disposed in the soil in each of the zones and, when interrogated, produces an electrical signal proportional to the level of moisture in the soil proximate that sensor- A microprocessor-based controller is coupled in controlling relationship to the solenoid valves in each of the plural zones and is effective to periodically transmit the interrogation signals to each of the moisture sensors. The moisture sensors then respond by transmitting the aforementioned electrical signal to the microprocessor-based controller. The microprocessor-based controller includes circuitry and software for selectively actuating the solenoid valves in the plurality of zones to an "on" state at predetermined times during a weekly period, unless the moisture sensor for that given zone indicates a predetermined sufficient level of moisture present. Thus, the microprocessor-based controller activates each of the solenoid valves on a given watering day for a predetermined watering interval beginning with the preprogrammed start time and lasting for a preprogrammed interval unless that interval is shortened in a particular zone where the moisture sensor for that zone indicates that the predetermined sufficient level of moisture has been reached.

To facilitate operator control, the microprocessor-based controller of the present invention includes a data entry device (push-buttons) and an alpha/numeric display device for facilitating the programming of the microprocessor-based controller. By calling up a series of menus on the display screen, data requested by the menu can be manually entered using only a few keys. The available menu screens include a "time/date" screen on which the time of day and the calendar date is presented on a real-time basis. A "start time" screen allows the operator to first designate six different times of day at which a watering cycle can be initiated. A "zone" screen allows all of the significant parameters including the watering day, the watering time and the start time for each of the zones to be sequentially entered into the memory of the microprocessor. A "soil sensor" screen permits the operator to define the soil type, its temperature and the relative moisture level which must be present in each of the several zones. A "system test" screen facilitates the operator in initiating one or more test sequences for evaluating the performance of the solenoid valves and spray heads in selected ones of the multiple zones. A "manual on/off" screen permits the programmed start and stop times to be overridden for any zone.

DESCRIPTION OF THE DRAWINGS

The foregoing features of the invention as well as other aspects thereof will become apparent to those skilled in the art from the following detailed description of a preferred embodiment of the invention, especially when considered in conjunction with the accompanying drawings in which.

DESCRIPTION OF THE PREFERRED EMBODIMENT

Figure 1:
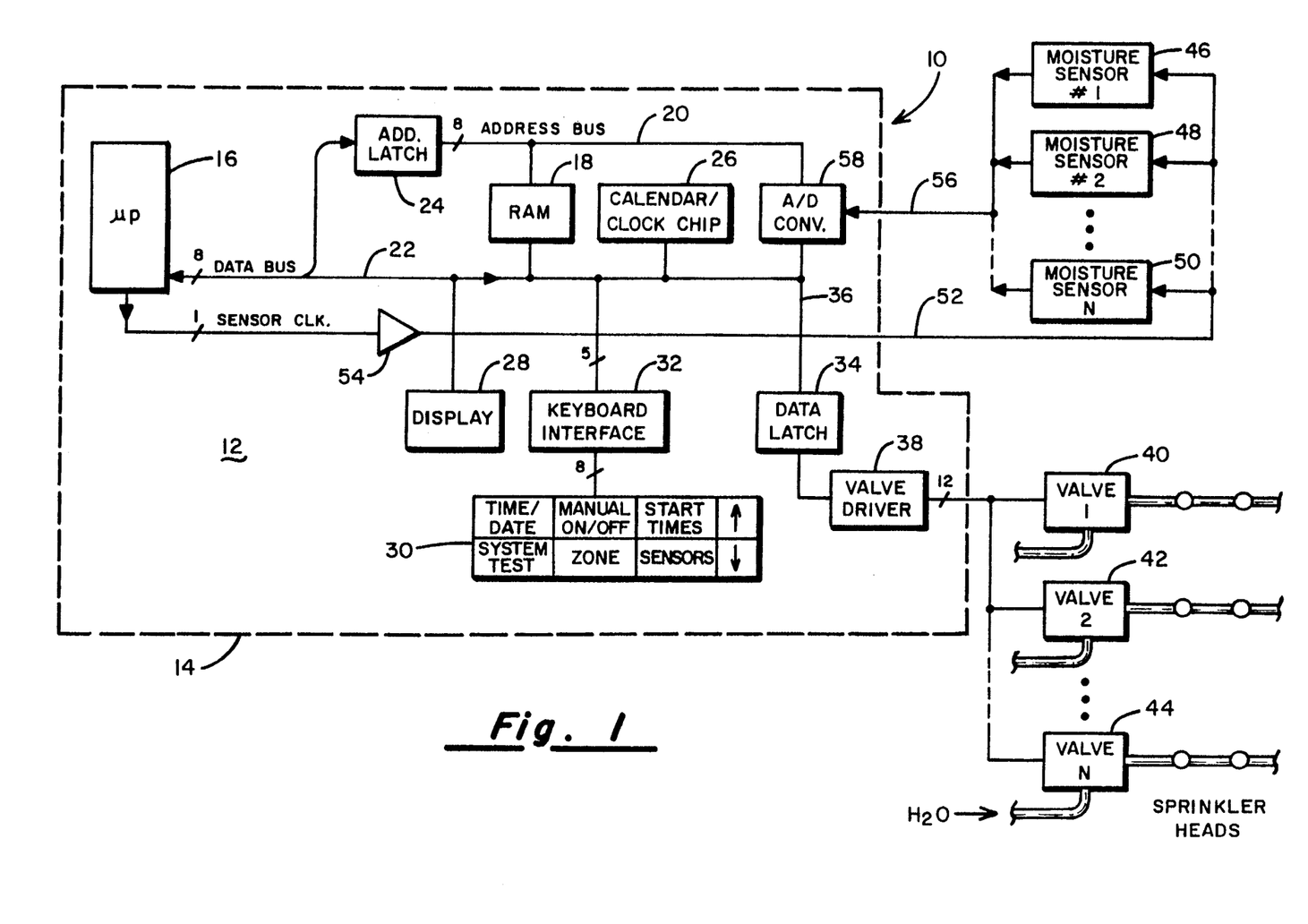
FIG. 1 is a block diagram of the microprocessor-based control system of the present invention.

Referring to FIG. 1, there is depicted by means of a block diagram the organization and construction of the computer-based irrigation system construction in accordance with the present invention. It is indicated generally by numeral 10 and comprises a microprocessor-based controller 12 shown enclosed by a broken line box 14. The heart of the microprocessor-based controller is an integrated circuit microprocessor 16 which may, for example, be a Intel 80C51 CMOS single chip, eight-bit microcomputer. The invention can be implemented using other commercially-available microprocessor chips, however. The Intel 80C51 incorporates therein a 128×8 read/write data memory, which has 4K bytes of EPROM and is expandable to 64K bytes via RAM module 18. The microprocessor 16 also includes four 8-bit ports (32 I/O lines), two 16-bit timer/counters, a high performance, full-duplex serial channel and on-chip oscillator and clock circuits. Eight of the I/O lines comprising Port 0 function as an address bus 20 and a data bus 22. Address information at Port 0 may be applied, via an address latch 24, to the address bus 20. Again, for exemplary purposes only, the address latch 24 may comprise a 74 ALS573 integrated circuit available from Texas Instruments Corporation.

Associated with the data bus 22 is a calendar/clock chip 26, which is preferably a DS1386 real-time clock available from Dallas Semiconductor Corporation. It provides a non-volatile time-of-day clock, an alarm and a 100-year calendar and is capable of counting seconds, minutes, hours, days, days of the week, date, month, and year with leap year compensation. It is adapted to readily provide either 12 or 24 hour clock with AM and PM indications in the 12-hour mode.

Also connected to the data bus is a LCD display panel 28 for allowing an operator to read up to four lines of alpha/numeric information which may be presented to the display device by the microprocessor 16. A panel containing eight push-button switches or keys is identified by numeral 30 and its output is fed through a keyboard interface circuit 32 to the data bus 22. As is indicated in FIG. 1, the eight push-button switches for programming and controlling the operation of the irrigation system 10 are labeled "time/date", "manual on/off", "start times" "up arrow", "system test", "zone" "sensors" and "down arrow". The manner in which the push-button switches are operated or sequenced in programming the operation of the microprogrammable controller will be set forth in greater detail hereinbelow. Suffice it for now to say that the individual push-button switches are effective to call up particular menus for display on the device 28 and to move the cursor through the menu. The "up arrow" and "down arrow" push-buttons are used to change or modify various parameters set out in the particular selected menu.

A data latch 34 is connected by lines 36 to the data bus and the outputs from the data latch are applied, via valve driver circuits 38, to selected ones of a plurality of solenoid controlled water valves 40, 42 ... 44. There is one such valve for each zone in the overall area to be irrigated and the valves, in turn, control in an on/off mode the water flowing to a plurality of sprinkler heads or other type of water dispensing device positioned in each zone so as to provide relatively uniform coverage of the area comprising that particular zone. With no limitation intended, the system of the present invention may readily accommodate twelve zones and can easily be expanded. The number of sprinkler heads or other water dispensing devices per zone or per valve is dependent upon the available water pressure of the water supply and the type of dispenser employed.

Also associated with each of the plurality of zones is a moisture sensor indicated by reference numerals 46, 48 ... 50. Moisture sensors suitable for use in the system of the present invention are available from the Irrometer Corporation of Riverside, Calif., and are sold under the trademark, WATER MARK ®. Each such sensor is periodically interrogated by a pulsatile signal provided by the microprocessor 16 on line 52, via a driver or buffer circuit 54. This interrogation signal causes the moisture sensors to output an analog voltage on line 56 which is proportional to the amount of moisture in the soil in which the sensors are embedded. The analog signal is fed to an analog/digital converter 58 which operates to create a digital representation of the measured analog quantity on the data bus 22 leading to the microprocessor 16. An analog-to-digital converter suitable for use in the system of the present invention may be the Type ADC 0808 available through the National Semiconductor Corporation. It comprises a monolithic CMOS device with an 8-bit A/D converter, an 8-channel multiplexor and microprocessor compatible control logic. Using successive approximation as the conversion technique, this 8-bit A/D convertor is readily interfaced to its associated microprocessor by the latched and decoded multiplexor address inputs and latched TTL tri-state outputs.

A fuller understanding of the mode of operation of the system of the present invention can be discerned from the following discussion of the manner in which the microprocessor 16 is programmed to carry out the multiple tasks required of the system. In this regard, reference will be made to FIGS. 2 through 7, which depict the several menu screen which may be called up during programming and operation of the system.

Figure 2:
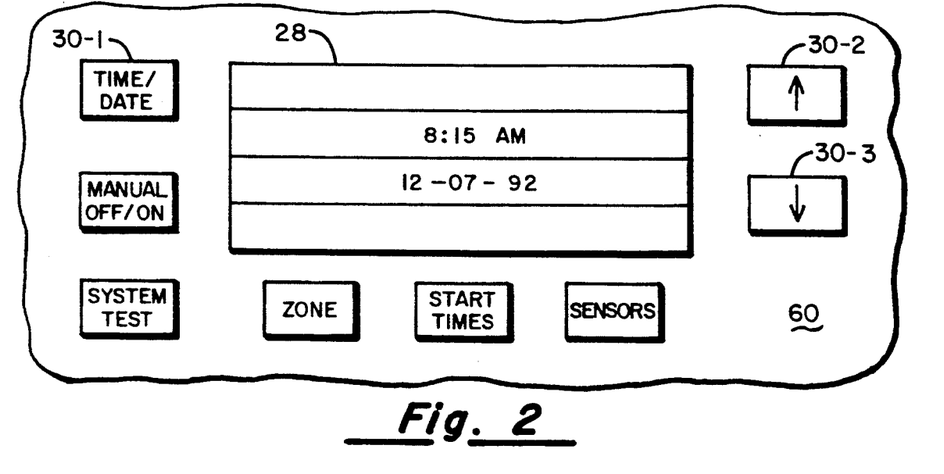
FIG. 2 shows the display with the time/date screen presented.

FIG. 2 shows a portion of the cabinet or housing 60 in which the microprocessor-based controller 14 is contained. The four-line display screen 28 and the push-button switches 30 are conveniently disposed relative to one another to facilitate the simultaneous viewing and operation. When the "time/date" push-button switch 30-1 on the left side of the screen 28 is first depressed, a screen like that shown in FIG. 2 is displayed. It shows the current time of day and the date by month, day and year. This screen will always remain on unless one of the other screens, yet to be described, is called up. If another screen is brought up but no interaction takes place by the operator depressing other push-buttons for a predetermined time, the screen will revert back to displaying time and date information.

At the time of original installation or after a power failure or the like, the date and time information can be entered into the microprocessor by first depressing the "time/date" push-button 30-1 and when it is successively depressed, the display moves from hour, to minutes, to AM/PM, to month, to day, and to year. The "up-arrow" push-button 30-2 and the "down-arrow" push-button 30-3 located on the right side of the screen may be used to set the correct hour, minutes, AM/PM, day, month and year in succession each time the "time/date" push-button 30-1 is cycled to move the cursor through the menu.

Figure 3:
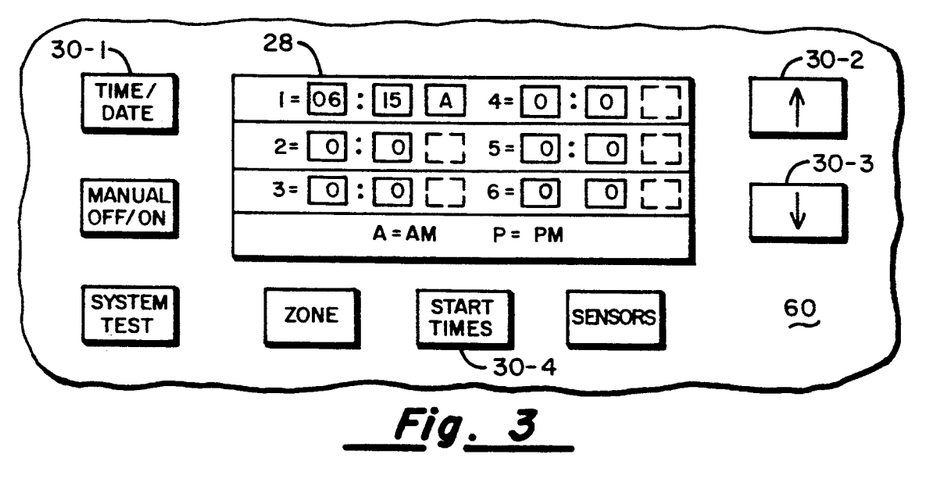
FIG. 3 shows the display with the "start time" screen displayed.

When the "start time" button 30-4 located below the screen 28 is depressed, the menu illustrated on the display screen 28 in FIG. 3 is brought up. Successive depressions of the "start time" button will cause a cursor to move to each of six different start time choices. Again, the "arrow" buttons 30-2 and 30-3 on the right side of the screen are used to set the operator's choice of start times. Start time is on the quarter-hour for both AM and PM.

Figure 4:
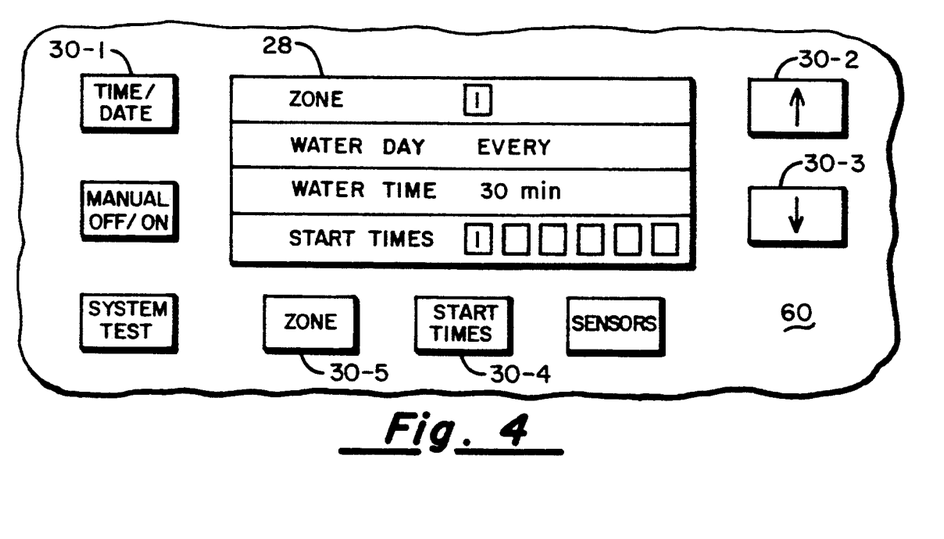
FIG. 4 illustrates the display with the "zone" screen presented.

FIG. 4 illustrates a typical "zone" menu screen which comes up when the "zone" push-button 30-5 at the bottom of the screen is depressed. This button is sequentially pushed to move from "zone", to "water day", to "water time", to "start time". When the top line of the screen reads "zone", the "arrow" buttons 30-2 and 30-3 can be used to change the zone number which will sequence through zones 1-12. When a particular zone is selected, the "zone" push-button 30-5 can again be depressed to move the cursor to "water day". Again, using the up and down arrows, the operator can sequence through a number of watering day choices, such as, odd day, even day, every day, every Nth day, only one of which is chosen for each zone. Again depressing the "zone" button 30-5 moves the cursor to "water time" on the screen and the up and down arrows are then used to sequence through choices of water times which may range between one minute and 9.9 hours. Here, "water time" refers to the length of the interval following the start time that the valve for the selected zone will be on during the selected water day. Again depressing the "zone" push-button 30-5 moves the cursor to "start time" and the up and down arrows may again be used to enter any or all of the previously selected numbered start times which were placed in the start time screen (FIG. 3). It will be appreciated, then, that each of the possible zones may have its solenoid valve turned on for preprogrammed durations on designated days with the valve opening at one or more start times on those days.

Figure 5:
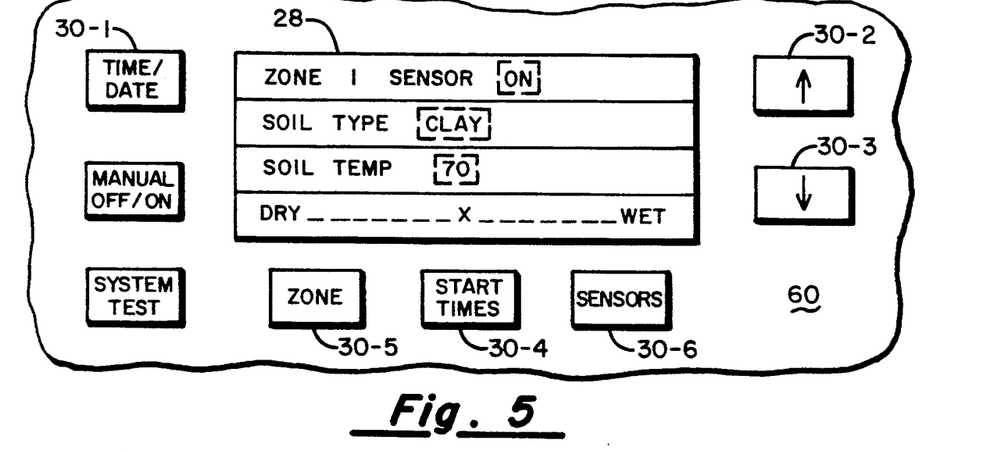
FIG. 5 illustrates the display with the "soil sensor" screen presented.

Turning next to FIG. 5, the menu comprising the "moisture sensor" screen is illustrated. By depressing the push-button 30-6 labeled "sensors" located below the screen, the operator can cause the cursor to move from the designations, "zone", to "sensor", to "soil type", to "soil temp" and to increase/decrease soil moisture level. At each cursor position, the up and down arrows 30-2 and 30-3 on the right side of the screen may be used to change the parameter, e.g., zone number, whether a sensor in the particular selected zone is to be off or on, the soil type choice and to move the "x" along a scale between a dry condition at the left of the screen and a wet condition towards the right of the screen. When it is the soil type that is to be entered, the choices are "sand", "clay", "loam". The operator will then select the particular soil type that the moisture sensor is disposed in.

When the cursor is at "soil temperature", the operator may choose the actual or average soil temperature. The arrow keys are used to sequence through temperature in degrees. Since the temperature of the entire area to be irrigated will tend to be identical in each of the zones, when the operator puts in a soil temperature entry for a first zone, all additional zones will show that same soil temperature so that it will not be necessary to use the push-buttons to enter temperatures for all of the other zones. When the cursor is highlighting the bottom line of the display of FIG. 5, the arrow keys are used to move the "x" to the left if dryer soil is desired and to move it to the right for wetter soil. This feature allows the operator to fine tune each of the zones to a desired moisture condition.

Figure 6:
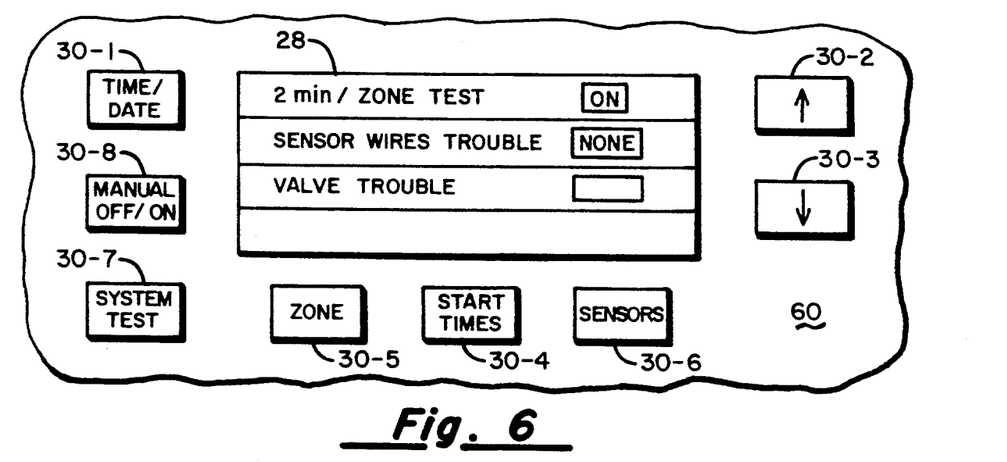
FIG. 6 illustrates the display with the "system test" screen presented.

FIG. 6 depicts the menu on the screen when a "system test" is called for. This menu is brought up when the "system test" push-button 30-7 is actuated. Here, the "arrow" push-buttons 302 and 30-3 are used to turn off or on a two-minute per zone test. As the controller cycles from zone to zone, the display will reflect an appropriate trouble indicator should the sensors fail or the valve malfunction.

Figure 7:
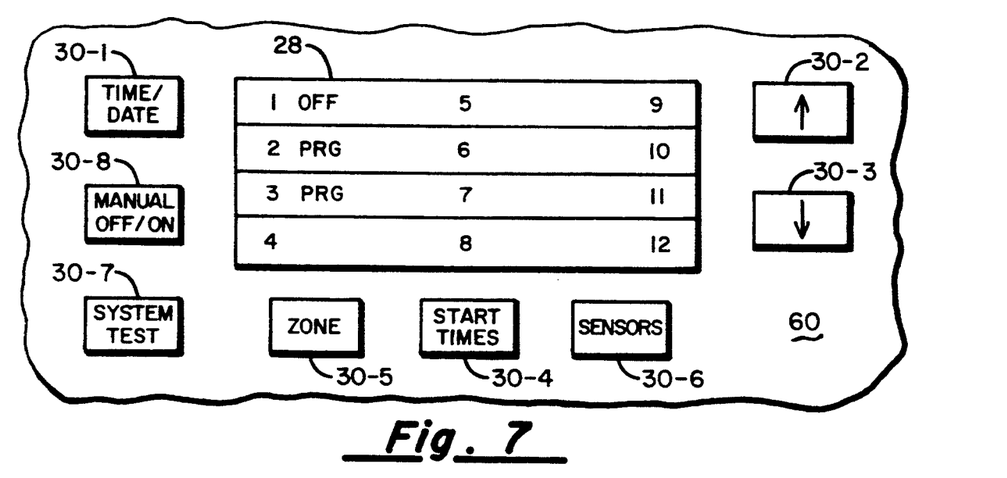
FIG. 7 illustrates the display with the "manual on/off" screen presented.

The "manual on/off" push-button 30-8, when first depressed, causes the menu screen shown in FIG. 7 to be presented on the display 28. Here, the numbers 1-12 (for a 12-zone system) are presented and subsequent depressions the up and down arrow key will serve to manually turn each zone on or off and to place that zone in the programmed (PRG) mode. If a zone has been manually turned on, water flows in the particular zone for the time previously set in the program using the screen of FIG. 4 or until the "manual off" push-button is actuated. Once the time has elapsed, the zone will revert back to its programmed mode. If water is running in a particular zone and the "manual" push-button sets the zone to "off", the valve in that zone will immediately close, irrespective of whether the watering time previously programmed had elapsed.

It can be seen, then, that the microprogrammable controller is very easy to program, requiring only a minimum number of keys (eight) for operation. Furthermore, the system allows irrigation to take place in zones where watering is required while bypassing those zones where adequate soil moisture is already present.

Another feature of the invention is that it may be programmed to allow all zones to run at the same time when engaged in drip irrigation. In drip irrigation, rather than employing spray heads which project the water through the air making it more subject to evaporation, the water is distributed through porous tubing at such a slow rate that adequate pressure can be maintained even through the valves for all zones are open. This feature is most important in those communities where water conservation of a great concern.

Having described the overall system hardware configuration in conjunction with the block diagram of FIG. 1, reference is now made to the flow charts of FIGS. 8(a) through 8(j) for an understanding of the software algorithm employed in the microprocessor. In that specific source code and object code is machine-dependent, it is not helpful to a full understanding of the invention to set out the detailed coding employed. Persons skilled in the art of programming who have the benefit of the foregoing description and explanation as well as the accompanying flow diagrams of the software are able to develop the code applicable to the particular microprocessor chip employed.

Figures 8A, 8B:
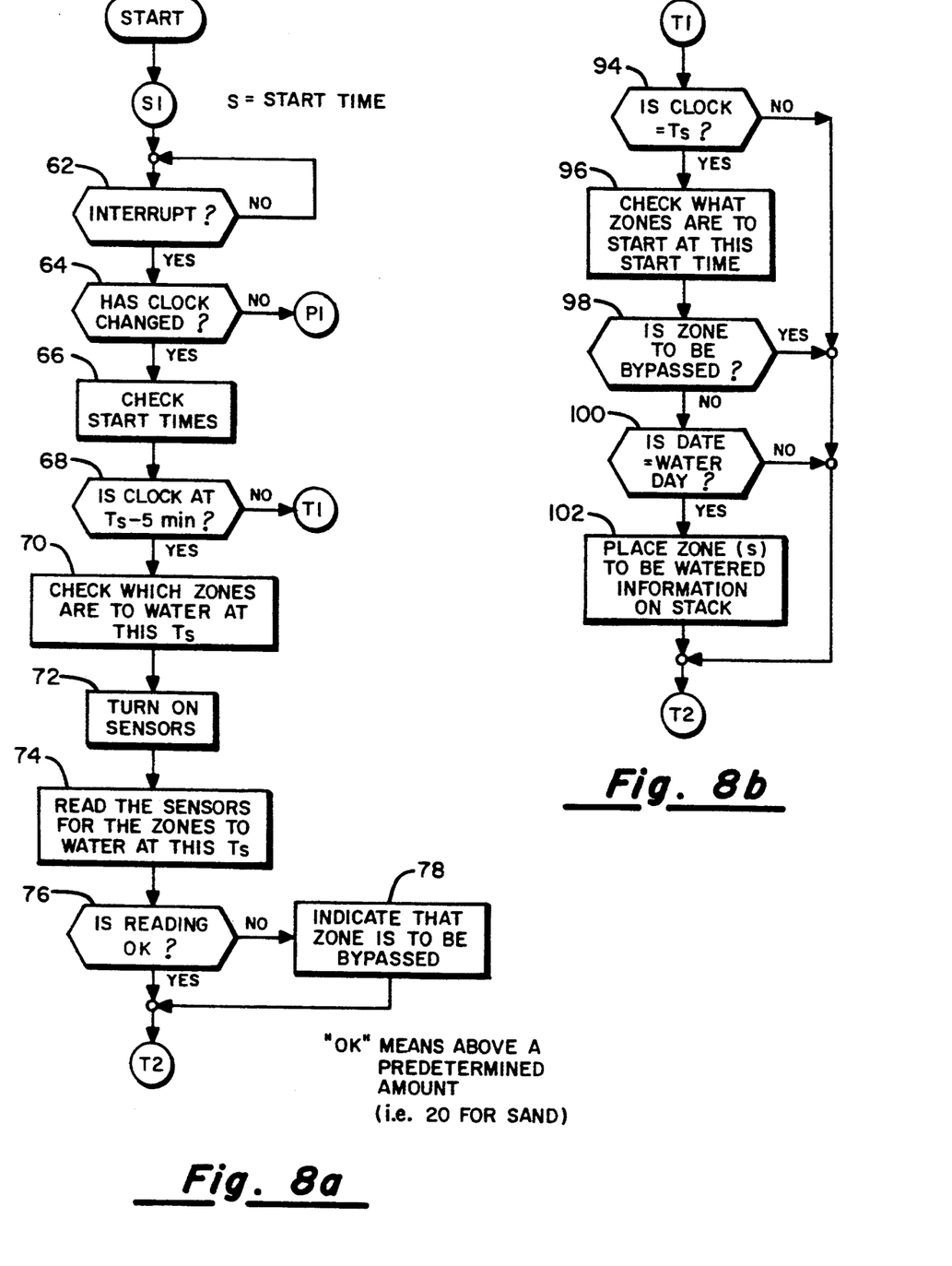
FIGS. 8(a) through 8(j) comprise a flow chart of the software executed by the microprocessor in the operation of the system of FIG. 1.

Referring to FIG. 8(a), operation starts by initializing the hardware and waiting for an interrupt as reflected by decision block 62. Interrupts are provided to the microprocessor upon the occurrence of the depression of a push-button key or a change in time. Upon the detection of an interrupt, a test is made at decision block 64 to determine whether it is due to a change in the clock information maintained by the calendar/clock chip 26. If the clock has not changed, control branches to the flow chart of FIG. 8(d), as indicated by the connector symbol T1. Assume for a moment that the clock has changed, the start times for each of the zones stored in the memory are checked (block 66) and then a further test is made to determine whether the clock has reached a starting time less five minutes ($T_S-5$) as indicated by decision block 68. If the clock has not reached $T_S-5$ minutes control exits to the flow chart of FIG. 8(b) as indicated by the connector symbol T1.

Assuming that the test at decision block 68 is affirmative, a check is made to determine which zones are to water at the particular upcoming start time and then the sensors for those zones are turned on. When the start time arrives, the sensors are interrogated and the analog signal from the effected sensors are read out and forwarded to the A/D converter 58 where the moisture related information is converted to a digital representation acceptable to the microprocessor. This sequence of operations is reflected by blocks 70, 72 and 74 in FIG. 8(a). The microprocessor then determines whether the moisture reading is below a predetermined value (such as 80, for sandy soil). If not, an indication is given that the zone failing this test is to be bypassed (block 78).

Figures 8C, 8D:
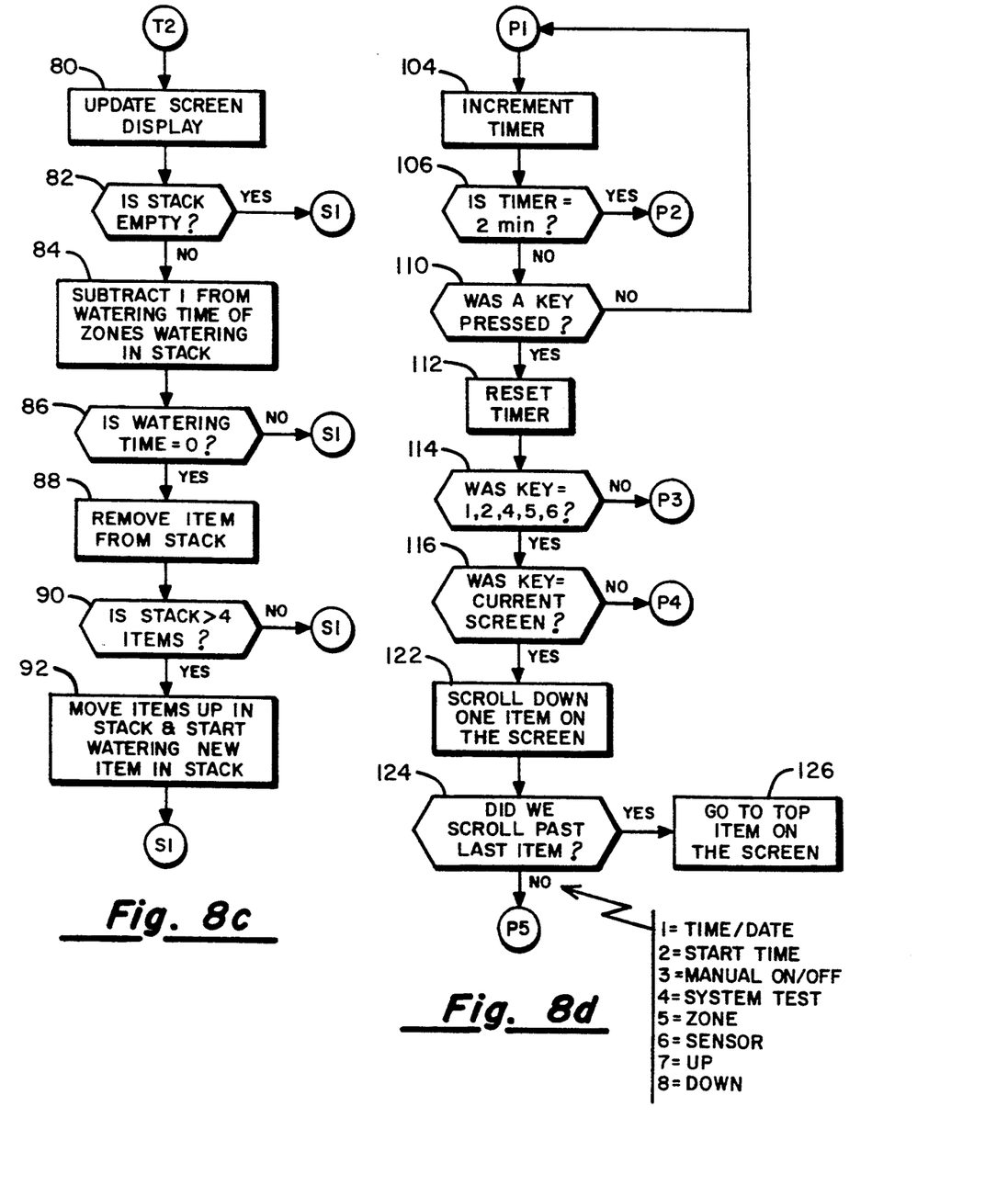
Figure 8E:
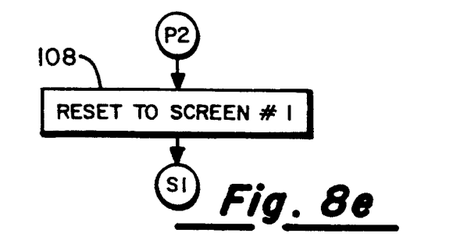

Assuming that the test at decision block 76 is affirmative, control passes to the flow diagram of FIG. 8(c) and the next operation is to update the screen display (block 80). A test is made to determine whether a memory stack in the microprocessor storing the zone numbers for watering at the upcoming start time is empty. This operation is reflected by the decision block 82. If it is, control reverts to the input of decision block 62 in FIG. 8(a). If the stack is not empty, "1" is subtracted from the watering time of those zones which would currently be watering and whose identifiers are contained in the aforementioned stack (block 84).

A test is next made to determine whether the watering time for the zones then in the stack has been decremented to "0" by the subtraction step (block 86) and, if not, control again reverts to the input of decision block 62 in FIG. 8(a). If the watering time has timed out, the zone or zones involved are removed from the stack (block 88). Next, a test is made to determine if there is an above ground sprinkler zone currently being watered (block 90). If there is not one, check to see if there is an above ground sprinkler zone waiting to start watering on the stack. If so, start watering that zone (block 92). However, if you are only using drip irrigation for your zones, you are not limited to running one zone at a time. You are able to run multiple zones at the same time. Control then exits to the input of block 62 in FIG. 8(a) and this sequence repeats.

Referring momentarily to block 68 in FIG. 8(a), had that test indicated that the clock had not decremented to a time five minutes prior to a designated start time, control exits to the sequence of operations reflected in the flow chart of FIG. 8(b). Here, a test is made to determine whether the clock has reached a start time and, if not, control reverts to the input of block 80 in FIG. 8(c). If the test at decision block 94 reveals that a start time has been reached, a check is made to determine what zones are to start at this particular start time. See block 96. A test is made to determine whether that zone is to be bypassed, which it would be if either the zone was shut off manually or the sensors indicate that the ground is too wet. Assuming that the zones are not to be bypassed, the test at decision block 100 determines whether the current date is a "water day" for the effected zone or zones. If it is, block 102 indicates that the zone or zones to be watered information is placed on the stack.

Referring to decision block 64 in FIG. 8(a), assume that this test is negative. Control exits under this condition to the flow diagram of FIG. 8(d) and the "calendar/clock" timer is incremented (block 104). It should be recalled from the previous description that when one of the push-buttons on the control panel is depressed to call up a new screen, that new screen will be displayed for two minutes, and if no other push-button has been depressed in the interim, the "time/date" screen of FIG. 2 will be displayed. It is the test at decision block 106 in FIG. 8(d) that makes this determination. If the test is affirmative, i.e., two minutes has elapsed since the previous key has been depressed, block 108 reflects that the display is returned to screen number "1" which is the "time/date" screen. If the timer has not reached its two-minute mark, the test reflected by decision block 110 is next carried out and if it is determined that a key had been pressed, the two-minute timer is reset to initiate a new two-minute period (block 112).

A test is now made to determine which key had been depressed to cause resetting of the timer. If key number 1, 2, 4, 5 or 6 was depressed (block 114), a determination is next made to see if the key in question is associated with the screen currently presented on the display (block 116). If it had been key "3" that had been depressed, the test at decision block 114 would have been negative and control would have passed to the flow diagram shown in FIG. 8(f). There, the test is made to affirm that key "3" was the one involved (decision block 118) and if it was, the operator sets up, manually, which zones he wants to turn on or off (block 120).

Assuming that the key that had been depressed had been associated with the screen currently being presented on the screen, the effect of depression of the key would be to cause the cursor to scroll down one item or parameter on the screen as shown by block 122 in FIG. 8(d). Next, a test is made to determine whether it had scrolled past the last item on the menu screen in question and, if so, the cursor loops back to the top entry on the screen (block 126). Assume that the test made at decision block 116 reveals that the key had been depressed was not associated with the screen currently being displayed, control would exit to the flow diagram of FIG. 8(g) where the information is read from the memory for the particular key that had been depressed so that it can be presented as a new screen (block 128) and then the cursor is moved to the top item on the screen and a current screen identifier is set to the appropriate key number (block 130).

Figure 8F:
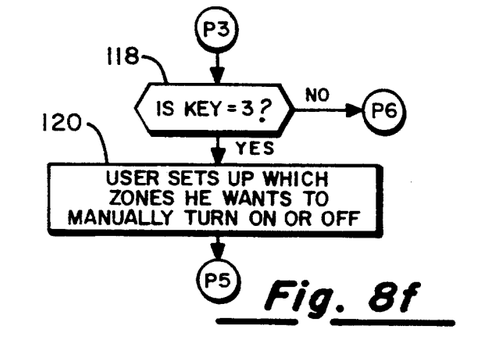
Figure 8G:
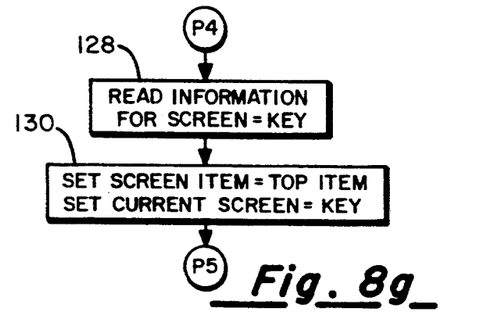
Figure 8H:
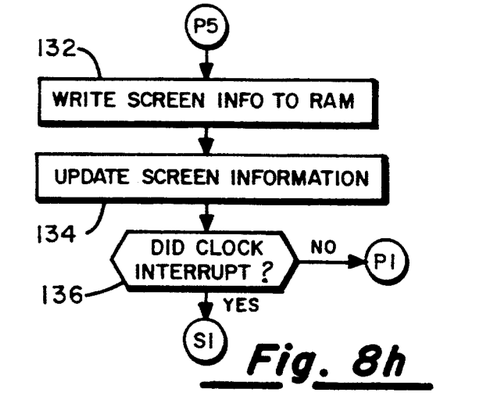

At the completion of that operation, control enters the flow diagram of FIG. 8(h) as it would had the test at decision block 124 proved negative. Here, the screen information is stored in the RAM memory 18 (FIG. 1) and following the operation reflected in block 132, the screen information is updated (block 134). Next, a test is made to determine whether a clock interrupt occurred (decision block 136) and if it had, control would again revert to the input of decision block 62 in the flow diagram of FIG. 8(a). Had a clock interrupt occurred, control would pass to connector P1 in FIG. 8(d) and the sequence reflected by that segment of the flow diagram is followed.

Figure 8I:
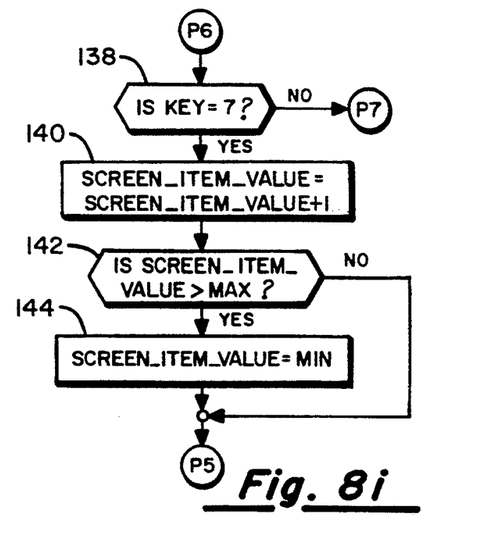
Figure 8J:
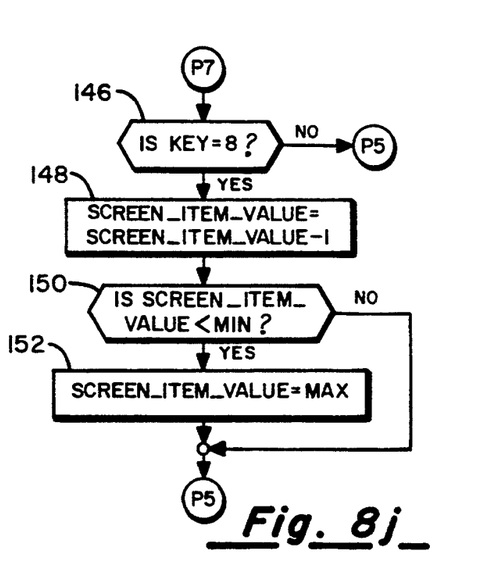

Directing attention again to the flow diagram of FIG. 8(f), if the test made at decision block 118 shows that key number "3" was not involved, control passes to the flow diagram of FIG. 8(i) and, at decision block 138, a test is made whether the depressed key had been the "down arrow", which is identified as key "7". If so, the particular parameter value for the item currently being updated on a particular menu screen would be incremented or advanced one position. (See block 140.) The test made at decision block 142 determines whether the screen item value is greater than a maximum value allowed. If it is, the screen item value is changed back to its minimum quantity (block 144). Following that, the operation indicated by the flow diagram of FIG. 8(h) is again repeated.

Had the test at decision block 138 indicated that it had not been key "7" that had been depressed, the only remaining alternative is that it must have been key=8, i.e., the up arrow. Referring to the flow diagram of FIG. 8(j), if the test key=8? is true, then the parameter value being updated on the screen is decremented (block 148). Following that operation, a further test is made at decision block 150 to determine whether the parameter value just entered is less than a permitted minimum for that value, and if it is, the parameter value is again set to its maximum permitted value (block 152). As indicated by the flow diagram of FIG. 8(j) if either the test at decision block 146 is negative or the operation reflected by block 152 is carried out, control passes to the input of block 132 in the flow diagram of FIG. 8(h) where the new value is stored in the RAM and the screen is modified to reflect the new value.

This completes the description of the software algorithm implemented in the memory of the microprocessor. It can be seen that the combination of hardware and software provides a irrigation controller that can be implemented at relatively low cost and which is extremely user friendly because it requires only eight keys in all to carry out a myriad of operations and the operator is, at all times, apprised by the display of just what needs to be done to complete the programming of the system so that the solenoid water valves will be made to operate in a desired mode.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An irrigation system for an area to be watered, the area being divided into a plurality of the discrete zones of possible different soil conditions, each zone including at least one water dispensing device and a solenoid valve having an "on" state and "off" state for controlling the flow of water to said at least one dispensing device for that zone, comprising:

(a) a moisture sensor for each of said zones, said moisture sensors penetrating into the soil and producing an electrical signal proportional to the level of moisture in the soil proximate said moisture sensor;

(b) a microprocessor-based controller coupled in controlling relationship to said solenoid valves in each of said plurality of zones, said microprocessor-based controller periodically transmitting an inquiry signal to said moisture sensors and said moisture sensors responding by transmitting said electrical signal to said microprocessor-based controller;

(c) means in said microprocessor-based controller for selectively actuating said solenoid valves in said plurality of zones to said "on" state at predetermined times during a weekly period unless the moisture sensor for a given zone indicates a predetermined sufficient level of moisture for that zone; and (d) an operator's panel including an alpha/numeric display and a plurality of push-button keys for facilitating programming of said microprocessor-based controller, certain of said push-button keys operative to present plural menu screens on said display and other of said push-button keys operative to enter new parameter values into said menu screens, said menu screens including at least one of a start-time screen, a time-date screen, a zone screen, a soil sensor screen and a system test screen, said zone screen displaying the selection of a zone number, a water day, a water time and a start time.

2. An irrigation system for an area to be watered, the area being divided into a plurality of the discrete zones of possible different soil conditions, each zone including at least one water dispensing device and a solenoid valve having an "on" state and "off" state for controlling the flow of water to said at least one dispensing device when for that zone, comprising:

(a) a moisture sensor for each of said zones, said moisture sensors penetrating into the soil and producing an electrical signal proportional to the level of moisture in the soil proximate said moisture sensor;

(b) a microprocessor-based controller coupled in controlling relationship to said solenoid valves in each of said plurality of zones, said microprocessor-based controller periodically transmitting an inquiry signal to said moisture sensors and said moisture sensors responding by transmitting said electrical signal to said microprocessor-based controller;

(c) means in said microprocessor-based controller for selectively actuating said solenoid valves in said plurality of zones to said "on" state at predetermined times during a weekly period unless the moisture sensor for a given zone indicates a predetermined sufficient level of moisture for that zone; and (d) an operator's panel including an alpha/numeric display and a plurality of push-button keys for facilitating programming of said microprocessor-based controller, certain of said push-button keys operative to present plural menu screens on said display and other of said push-button keys operative to enter new parameter values into said menu screens, said menu screens, including at least one of a start-time screen, a time/date screen, a zone screen, a soil sensor screen and a system test screen, said soil sensor screen displaying the selection of a zone number, a sensor on/off status, a soil type in which said moisture sensor for the particular zone is located, the average soil temperature and relative moisture level desired for each particular selected zone.

3. An irrigation system for an area to be watered, the area being divided into a plurality of the discrete zones of possible different soil conditions, each zone including at least one water dispensing device and a solenoid valve having an "on" state and "off" state for controlling the flow of water to said at least one dispensing device for that zone, comprising:

(a) a moisture sensor for each of said zones, said moisture sensors penetrating into the soil and producing an electrical signal proportional to the level of moisture in the soil proximate said moisture sensor;

(b) a microprocessor-based controller coupled in controlling relationship to said solenoid valves in each of said plurality of zones, said microprocessor-based controlled periodically transmitting an inquiry signal to said moisture sensors and said moisture sensors responding by transmitting said electrical signal to said microprocessor-based controller;

(c) means in said microprocessor-based controller for selectively actuating said solenoid valves in said plurality of zones to said "on" state at predetermined times during a weekly period unless the moisture sensor for a given zone indicates a predetermined sufficient level of moisture for that zone; and (d) an operator's panel including an alpha/numeric display and a plurality of push-button keys for facilitating programming of said microprocessor-based controller, certain of said push-button keys operative to present plural menu screens on said display and other of said push-button keys operative to enter new parameter values into said menu screens, said menu screens including at least one of a start-time screen, a time/date screen, a zone screen, a soil sensor screen and a system test screen, said system test screen displaying diagnostic information pertaining to performance of said irrigation system.

4. An irrigation system for an area to be watered, the area being divided into a plurality of the discrete zones of possible different soil conditions, each zone including at least one water dispensing device and a solenoid valve having an "on" state and "off" state for controlling the flow of water to said dispensing device(s) when for that zone, comprising:

(a) a moisture sensor for each of said zones, said moisture sensors penetrating into the soil and producing an electrical signal proportional to the level of moisture in the soil proximate said moisture sensor;

(b) a microprocessor-based controller coupled in controlling relationship to said solenoid valves in each of said plurality of zones, said microprocessor-based controller periodically transmitting an inquiry signal to said moisture sensors and said moisture sensors responding by transmitting said electrical signal to said microprocessor-based controller;

(c) means in said microprocessor-based controller for selectively actuating said solenoid valves in said plurality of zones to said "on" state at predetermined times during a weekly period unless the moisture sensor for a given zone indicates a predetermined sufficient level of moisture for that zone; AND (d) an operator's panel including an alpha/numeric display and a plurality of push-button keys for facilitating programming of said microprocessor-based controller, certain of said push-button keys operative to present plural menu screens on said display and other of said push-button keys operative to enter new parameter values into said menu screens, said menu screens including at least one of a start-time screen, a time/date screen, a zone screen, a soil sensor screen and a system test screen, said start-time screen displaying the entry of a plurality of desired times during a twenty-four hour period for said plurality of solenoid valves to be turned on.

5. The irrigation system as in claim 4 wherein said microprocessor-based controller activates each of said solenoid valves for a predetermined watering interval beginning with said predetermined times, said watering interval being shortened in a particular zone when said moisture sensor for that zone indicates said predetermine sufficient level of moisture has been reached.

6. The irrigation system as in claim 4 wherein said microprocessor-based controller comprises:

(a) a calendar/clock integrated circuit chip for maintaining a real-time status of the date and time;

(b) means for selectively displaying the date and time;

(c) means for comparing said real-time status of the date and time with said predetermined times during a weekly period for actuating said solenoid valves with real-time status of the date and time corresponds to said predetermined times.

7. The irrigation system as in claim 4 wherein said microprocessor-based controller comprises:
(a) a calendar/clock integrated circuit chip for maintaining a real-time status of the date and time;
(b) said time/date screen arranged to display the time/date maintained by said calendar/clock integrated circuit chip.

8. The irrigation system as in claim 4 wherein said zone screen displays the selection of a zone number, a water day, a water time and a start time.

9. The irrigation system as in claim 4 wherein said soil sensor screen displays the selection of a zone number, a sensor on/off status, a soil type in which said moisture sensor for the particular zone is located, the average soil temperature and relative moisture level desired for each particular selected zone.

10. The irrigation system as in claim 4 wherein said system test screen displays diagnostic information pertaining to performance of said irrigation system.

11. The irrigation system as in any one of claims 1–10 wherein said microprocessor-based controller comprises:
(a) a calendar/clock integrated circuit chip for maintaining a real-time status of the date and time;
(b) means for selectively displaying the date and time;
(c) means for comparing said real-time status of the date and time with said predetermined times during a weekly period for actuating said solenoid valves when real-time status of the date and time corresponds to said predetermined times.

12. The irrigation system as in any one of claims 1–10 wherein said microprocessor-based controller comprises:
(a) a calendar/clock integrated circuit chip for maintaining a real-time status of the date and time;
(b) said time/date screen arranged to display the time/date maintained by said calendar/clock integrated circuit chip.

* * * * *

UNITED STATES PATENT AND TRADEMARK OFFICE
CERTIFICATE OF CORRECTION

PATENT NO. : 5,337,957
DATED : August 16, 1994
INVENTOR(S) : Troy C. Olson

It is certified that error appears in the above-indentified patent and that said Letters Patent is hereby corrected as shown below:

Column 11, line 60, change "controlled" to -- controller --.

Signed and Sealed this

Eighth Day of November, 1994

Attest:

BRUCE LEHMAN

Attesting Officer        Commissioner of Patents and Trademarks